(12) United States Patent
Suzuki

(10) Patent No.: US 7,359,300 B2
(45) Date of Patent: Apr. 15, 2008

(54) RECORDING CONDITION DETERMINING METHOD, PROGRAM, AND MEDIUM, INFORMATION RECORDING APPARATUS, AND INFORMATION RECORDING SYSTEM

(75) Inventor: Haruyuki Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 743 days.

(21) Appl. No.: 10/728,795

(22) Filed: Dec. 8, 2003

(65) Prior Publication Data

US 2004/0141442 A1   Jul. 22, 2004

(30) Foreign Application Priority Data

Dec. 11, 2002   (JP) .............................. 2002-359361

(51) Int. Cl.
G11B 7/00   (2006.01)
(52) U.S. Cl. .................................. 369/53.26; 369/47.5
(58) Field of Classification Search ...................... None
See application file for complete search history.

(56) References Cited

U.S. PATENT DOCUMENTS

| | | | |
|---|---|---|---|
| 5,218,588 A | 6/1993 | Suzuki | |
| 5,222,057 A | 6/1993 | Suzuki et al. | |
| 5,309,418 A | 5/1994 | Suzuki | |
| 5,371,726 A | 12/1994 | Suzuki | |
| 5,375,108 A | 12/1994 | Suzuki | |
| 5,442,607 A | 8/1995 | Suzuki | |
| 5,487,055 A | 1/1996 | Suzuki | |
| 5,521,892 A | 5/1996 | Suzuki | |
| 5,604,722 A | 2/1997 | Suzuki | |
| 5,631,886 A | 5/1997 | Suzuki | |
| 6,128,261 A | 10/2000 | Suzuki | |
| 6,333,903 B1 | 12/2001 | Suzuki | |
| 2002/0012296 A1 | 1/2002 | Suzuki | |
| 2002/0012297 A1 | 1/2002 | Suzuki | |
| 2002/0044507 A1 | 4/2002 | Hagiwara et al. | |
| 2002/0064110 A1* | 5/2002 | Sato ........................ | 369/47.53 |
| 2002/0131350 A1* | 9/2002 | Kurobe et al. ............. | 369/47.4 |
| 2003/0035354 A1 | 2/2003 | Suzuki | |
| 2003/0043714 A1* | 3/2003 | Takeda .................... | 369/47.53 |
| 2003/0048713 A1 | 3/2003 | Suzuki | |
| 2003/0156514 A1 | 8/2003 | Suzuki | |

FOREIGN PATENT DOCUMENTS

| | | |
|---|---|---|
| JP | 2001-67672 | 3/2001 |
| JP | 2002-251738 | 9/2002 |

* cited by examiner

*Primary Examiner*—Wayne Young
*Assistant Examiner*—Lixi Chow
(74) *Attorney, Agent, or Firm*—Dickstein Shapiro LLP

(57) ABSTRACT

A recording condition determining method is disclosed for realizing high quality recording at high speed while preventing the degradation of a light source. Specifically, a determination is made as to whether an optimal recording power obtained through OPC or running OPC exceeds a predetermined threshold value, and if it is determined that the optimal recording power exceeds the threshold value, a choice is selected out of multiple choices including the choice of not changing the optimal recording power based on a predetermined selection criterion. Then, a recording condition is established based on the selected choice. By setting the selection criterion so that the choice of not changing the optimal recording power is selected when damage to the light source is expected to be minimal, recording may be performed without lowering the recording speed even when the optimal recording power exceeds the threshold value.

7 Claims, 7 Drawing Sheets

FIG.5A

| Pw-Pk (mW) | TOTAL RECORDING TIME (min) | DEGRADATION DEGREE |
|---|---|---|
| 1 | 1000 | 1000 |
| 2 | 300 | 600 |
| 3 | 200 | 600 |
| 4 | 50 | 200 |
| 5 | 0 | 0 |
| 6 | 0 | 0 |

FIG.5B

| Pw-Pk (mW) | TOTAL RECORDING TIME (min) | DEGRADATION DEGREE |
|---|---|---|
| 1 | 1000 | 1000 |
| 2 | 320 | 640 |
| 3 | 200 | 600 |
| 4 | 50 | 200 |
| 5 | 0 | 0 |
| 6 | 0 | 0 |

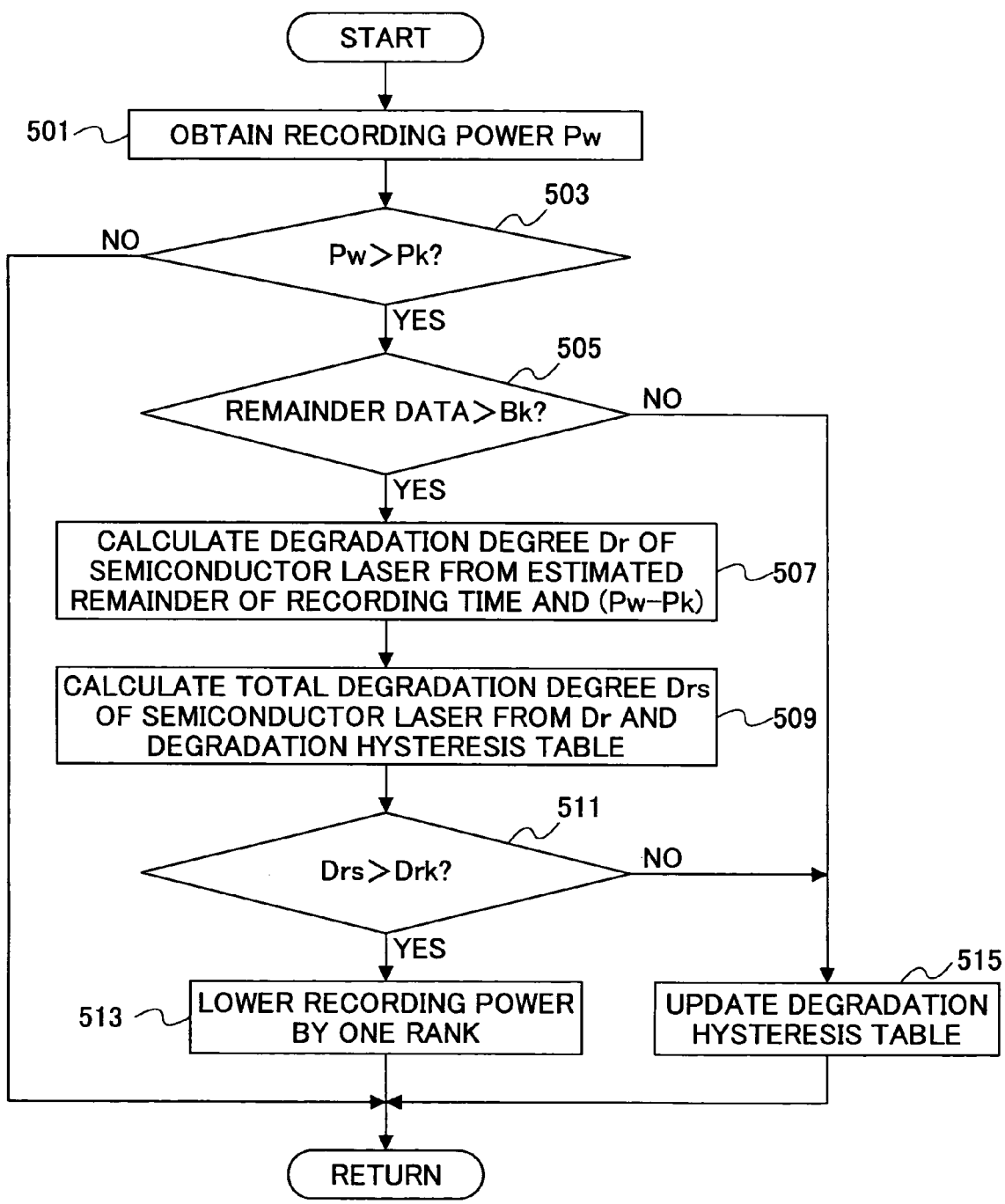

RECORDING CONDITION DETERMINING METHOD, PROGRAM, AND MEDIUM, INFORMATION RECORDING APPARATUS, AND INFORMATION RECORDING SYSTEM

BACKGROUND OF THE INVENTION

1. Field of the Invention

The present invention relates to a recording condition determining method, program and medium, an information recording apparatus and an information recording system. Particularly, the present invention relates to a recording condition determining method for determining an optimum recording condition upon recording information on an information recording medium, a program used in an information recording apparatus, a storage medium on which such program is stored, an information recording apparatus that records information on an information recording medium, and an information recording system including an information recording apparatus and an information processing apparatus.

2. Description of the Related Art

In recent years and continuing, with the improvement of the functions of the personal computer (referred to as PC hereinafter), it is becoming possible to handle AV (Audio-Visual) information such as music and images in the PC. Since the information amount of AV information is very large, attention is being drawn to optical disks such as the CD (compact disk) and DVD (digital versatile disk) as information recording media. In turn, the price of such media is falling, and the optical disk apparatus as an information recording apparatus is becoming very popular as one of the peripheral apparatuses of the PC. In an optical disk apparatus, a laser beam is irradiated so as to form microscopic light spots on a recording surface of an optical disk on which surface a spiral track or concentric tracks are formed to record and erase information, and information is replayed (reproduced) based on light reflected from the recording surface. The optical disk apparatus has an optical pickup device as a device for irradiating the laser beam onto the recording surface of the information recording medium as well as receiving the reflected light from the recording surface.

Normally, the optical pickup device includes a light source for emitting the laser beam at a predetermined light emission power (output), an optical system for leading the laser beam emitted from the light source to the recording surface of the information recording medium and leading the laser beam reflected from the recording surface to a predetermined light receiving position, and an optical receiver placed at the light receiving position, for example.

The optical disk has mark (pit) regions and space regions that have differing reflection rates, and information is recorded on the optical disk based on the lengths of the mark regions and space regions and their combination. Thus, in recording information on an optical disk, the light emission power of the laser beam emitted from the light source is controlled so that mark regions and space regions can be formed on the recording surface at their respective predetermined positions in their respective predetermined lengths.

For example, in the case of recording information on a recordable optical disk such as the CD-R (CD-recordable), the DVD-R (DVD-recordable), and the DVD+R (DVD+recordable) that contain organic dye in their recording layers (referred to as 'dye disk' hereinafter), a mark region is formed by raising the light emission power to heat and melt the dye so that the properties and shape of a substrate portion that is in contact with the irradiated dye are changed. As for the formation of a space region, the light emission power is lowered to a level equivalent to that used in a replaying operation so that the properties and shape of the substrate will not be changed. As a result, the mark region has a lower reflection rate compared to the space region.

Also, in the case of recording information on a rewritable optical disk such as the CD-RW (CD-rewritable), DVD-RW (DVD-rewritable), and DVD+RW (DVD+rewritable) that contain a special alloy in their recording layers (referred to as 'phase-change disk' hereinafter), a mark region is formed by heating the alloy to a first temperature and then rapidly cooling the heated alloy so that it will be in an amorphous (non-crystalline) state. As for the formation of a space region, the alloy is heated to a second temperature (<first temperature) after which it is gradually cooled to be in a crystalline state. Thus, the mark region has a lower reflection rate compared to the space region.

The light emission power required for the formation of the mark region (also referred to as 'recording power' hereinafter) greatly depends on the recording speed. Namely, with the increase of the recording speed, there is a growing tendency for the recording power to be increased. However, as the recording power is increased, this may exceed the power capacity of the light source, and the service life of the light source may be shortened as a result. In turn, a number of methods for setting the recording speed according to the power capacity of the light source have been proposed in the prior art (e.g., refer to Japanese Laid-Open Patent Publication No.2002-251738, and Japanese Laid-Open Patent Publication No.2001-67672).

However, according to the methods disclosed in the above prior art documents, when the recording power for obtaining a predetermined recording quality is not within the permissible range of the light source, the recording power is lowered so that the recording speed is greatly reduced and the recording time is increased even when the influence of the original recording power on the service life of the light source may be relatively small.

SUMMARY OF THE INVENTION

The present invention has been developed in response to the above problems of the related art, and its first object is to provide a recording condition determining method, an information recording apparatus and an information recording system for realizing high quality recording with high speed while preventing the degradation of the light source.

A second object of the present invention is to provide a program that is executed by a computer for controlling the information recording apparatus and is capable of realizing high quality recording with high speed while preventing the degradation of the light source, and a storage medium on which such program is recorded.

Specifically, a recording condition determining method of the present invention is realized in an information recording apparatus that records information on an information recording medium using an optical beam emitted from a light source, and the method includes:

a first step of determining whether an optimal recording power of the light source exceeds a preset threshold value based on at least one of a result of test writing on the information recording medium and a result of receiving reflected light from the information recording medium during recording;

a second step of selecting according to a predetermined selection criterion at least one of a plurality of choices including a choice of not changing the optimum recording power, the second step being realized when it is determined in the first step that the optimum recording power exceeds the threshold value;

a third step of establishing a recording condition based on the selected choice.

Accordingly, a determination is made as to whether an optimal recording power of the light source exceeds a preset threshold value based on the result of test writing on the information recording medium or the result of receiving reflected light from the information recording medium during recording (first step), and if it is determined that the optimum recording power exceeds the threshold value, a choice is selected out of a plurality of choices including the choice of not changing the optimum recording power according to a predetermined selection criterion (second step). Then, the recording condition is established based on the selected choice (third step). Thus, for example, by setting the selection criterion so that the choice of not changing the optimal recording power is selected when the damage to the light source is expected to be minimal, recording may be realized without lowering the recording speed even when the optimal recording power exceeds the threshold value. Therefore, high quality recording at high speed can be performed while preventing the degradation of the light source.

Various factors may be considered as the selection criterion for selecting the choice, and in one embodiment, the selection criterion may correspond to a criterion of selecting the choice of not changing the optimum recording power if an estimation of the influence on the service life of the light source does not exceed a predetermined level.

In a further embodiment, the influence on the service life of the light source may be estimated based on at least one of an amount of data to be recorded, an amount of time required for recording, and hysteresis information pertaining to recording power and recording time of past recordings. It is noted that the 'amount of data to be recorded' includes the recording data as well as the remainder of recording data described in the description of preferred embodiments. Also, the 'time required for recording' includes the recording time as well as the remaining recording time.

In another embodiment, the first step may include determining whether the optimum recording power exceeds the threshold value based on the result of test writing on the information recording medium; and the choices may further include at least one of a choice of obtaining a new optimum recording power by lowering a recording speed and conducting the test writing once more and a choice of changing the optimum recording power to a predetermined value in the vicinity of the threshold value.

In another embodiment, the first step may include determining whether the optimum recording power exceeds the threshold value based on the result of receiving reflected light from the information recording medium during recording; and the choices may further include a choice of lowering the optimal recording power by one rank.

In another embodiment, the selection criterion may correspond to a preset criterion.

In another embodiment, the selection criterion may correspond to a criterion set according to an external input.

In another embodiment, the selection criterion may correspond to a criterion for selecting one choice out of the choices including the choice of not changing the optimum recording power, and at least one of a choice of obtaining a new optimum recording power by lowering the recording speed and conducting the test writing once more, a choice of changing the optimum recording power to a predetermined value in the vicinity of the threshold value, and a choice of lowering the optimum recording power by one rank.

In another embodiment, the recording condition determining method of the present invention may further include:

a fourth step of storing hysteresis information including the optimum recording power and a light emission time of the light source at the optimum recording power, the fourth step being performed when the choice of not changing the optimum recording power is selected according to the selection criterion in the second step. In this case, data used for the estimation of the influence on the service life of the light source based on the recording power and recording time of past recordings may be accumulated.

A program of the present invention is implemented in an information recording apparatus that is adapted to record information on an information recording medium using an optical beam emitted from a light source, and the program runs on a control unit of the information recording apparatus to execute:

a first procedure of determining whether an optimal recording power of the light source exceeds a preset threshold value based on at least one of a result of test writing on the information recording medium and a result of receiving reflected light from the information recording medium during recording;

a second procedure of selecting according to a predetermined selection criterion at least one of a plurality of choices including a choice of not changing the optimum recording power, the second procedure being realized when it is determined in the first procedure that the optimum recording power exceeds the threshold value;

a third procedure of establishing a recording condition based on the selected choice.

The program of the present invention is loaded into a main memory, and when the start address of this program is set to a program counter, the control unit of the information recording apparatus determines whether the optimal recording power of the light source exceeds the preset threshold value based on the result of test writing on the information recording medium or the result of receiving reflected light from the information recording medium during recording, and if it is determined that the optimum recording power exceeds the threshold value, the control unit makes a selection out of a plurality of choices including the choice of not changing the optimum recording power based on a predetermined selection criterion. Then the control unit establishes the recording condition based on the selected choice. Thus, the recording condition determining method of the present invention can be realized by the control unit of the information recording apparatus implementing the program of the present invention, and high quality recording at high speed can be performed while preventing the degradation of the light source.

In one embodiment of the present invention, the selection criterion may correspond to a criterion of selecting the choice of not changing the optimum recording power if an estimation of the influence on the service life of the light source does not exceed a predetermined level.

A storage medium of the present invention is a computer readable storage medium that stores the recording condition determining program of the present invention.

An information recording apparatus of the present invention is adapted to record information on an information recording medium using an optical beam emitted from a light source, and the apparatus includes:

recording power obtaining means for obtaining an optimal recording power of the light source based on at least one of a result of test writing on the information recording medium and a result of receiving reflected light from the information recording medium while recording information;

determination means for determining whether the optimum recording power exceeds a preset threshold value;

selection means for selecting according to a predetermined selection criterion at least one of a plurality of choices including a choice of not changing the optimal recording power, the selection means being realized when it is determined by the determination means that the optimal recording power exceeds the threshold value; and establishing means for establishing a recording condition based on the selected choice.

The optimal recording power of the light source is obtained by the recording power obtaining means based the result of test writing on the information recording medium or the result of receiving reflected light from the information recording medium while recording information, and a determination is made as to whether the optimum recording power exceeds the preset threshold value by the determination means. Then, when it is determined by the determination means that the optimal recording power exceeds the threshold value, a choice is selected out of the choices including the choice of not changing the optimal recording power by the selection means according to a predetermined selection criterion, and the recording condition is established based on the selected choice by the establishing means. By setting the selection criterion in the selection means so that the choice of not changing the optimal recording power is selected when the damage to the light source is expected to be minimal, for example, recording may be realized without lowering the recording speed even when the optimal recording power exceeds the threshold value, thereby enabling high quality recording at high speed while preventing the degradation of the light source.

In one embodiment, the information recording apparatus of the present invention may further include:

first storage means in which hysteresis information pertaining to the light source is stored; and storing means for storing in the first storage means hysteresis information including the optimal recording power and a light emission time of the light source at said optimal recording power, the storing means being realized when the choice of not changing the optimal recording power is selected by the selection means.

In another embodiment, the information recording apparatus of the present invention may further include:

type information obtaining means for obtaining type information of the information recording medium; and second storage means storing information on at least one type of information recording medium of which a power margin extends over a predetermined value in the vicinity of the threshold value; wherein the choices further include a choice of changing the optimal recording power to the predetermined value in the vicinity of the threshold value; and the selection means is arranged to select the choice of changing the optimal recording power to the predetermined value in the vicinity of the threshold value when the type information of the information recording medium obtained by the type information obtaining means corresponds to the type of information recording medium stored in the second storage means.

In another embodiment, the information recording apparatus may further include notification means for notifying an external apparatus of a determination result of the determination means.

An information recording system of the present invention for recording information on an information recording medium includes the information recording apparatus of the present invention and an information processing apparatus that is adapted to control the information recording apparatus.

In one embodiment of the present invention, the information processing apparatus may include a display unit that is adapted to display the choices including the choice of not changing the optimal recording power when the optimal recording power exceeds the threshold value, an input unit for selecting at least one of the choices displayed by the display unit, and a notification unit for notifying the information recording apparatus of the choice selected at the input unit. In this case, for example, the user may be able to set the selection criterion.

BRIEF DESCRIPTION OF THE DRAWINGS

FIGS. 5A and 5B show examples of hysteresis tables.

FIG. 7 is a flowchart illustrating a recording condition determination process according to an embodiment of the present invention that is performed during recording.

DESCRIPTION OF THE PREFERRED EMBODIMENTS

In the following, preferred embodiments of the present invention are described with reference to FIGS. 1~7.

Figure 1:
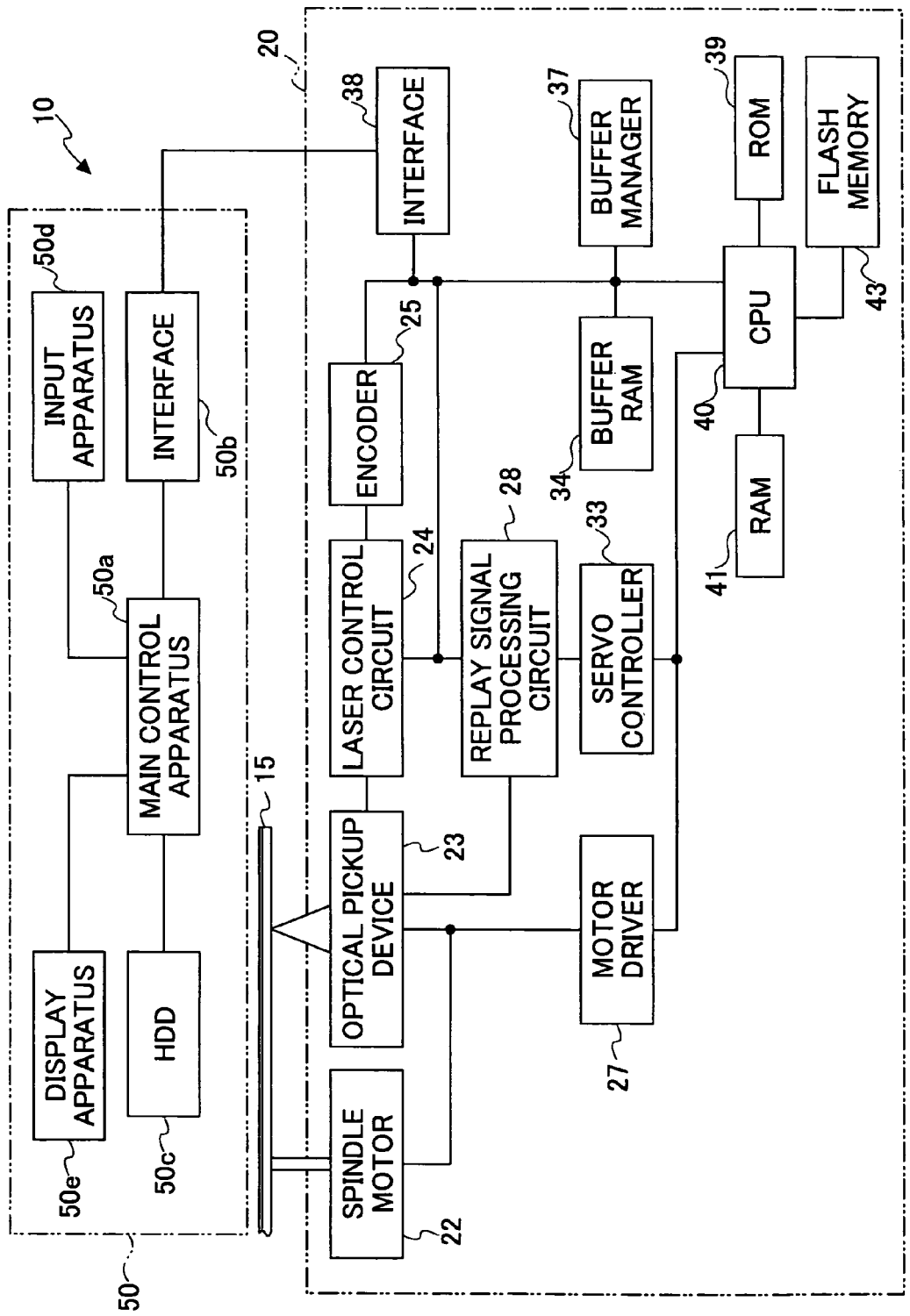
FIG. 1 is a block diagram showing a configuration of an information recording system according to an embodiment of the present invention.

FIG. 1 is a block diagram illustrating a configuration of an information recording system according to an embodiment of the present invention.

Information recording system 10 shown in FIG. 1 includes an optical disk apparatus 20 as an information recording apparatus, and a host 50 as an information processing apparatus that controls the optical disk apparatus 20.

The optical disk apparatus 20 may include, for example, a spindle motor 22 for rotating an optical disk 15 corresponding to an information recording medium, an optical pickup device 23, a laser control circuit 24, an encoder 25, a motor driver 27, a replay signal processing circuit 28, a server controller 33, a buffer RAM 34, buffer manager 37, an interface 38, a ROM 39 as the storage medium, a CPU 40, a RAM 41, and a flash memory 43 as first and second memory means. It is noted that the connection lines indicated in FIG. 1 are merely representative lines for illustrating the overall flow of signals and information and do not represent the entire connection relation between the blocks. Also, according to the present embodiment, the optical disk apparatus 20 may be compatible with an information recording medium conforming to a DVD standard (referred to as 'DVD' hereinafter) and an information recording medium conforming to a CD standard (referred to as 'CD' hereinafter), for example.

The optical pickup device 23 may be a device for irradiating a laser beam onto a recording surface of the optical disk 15 on which surface a spiral track or concentric tracks are formed, and receiving reflected light from the recording surface.

Figure 2:
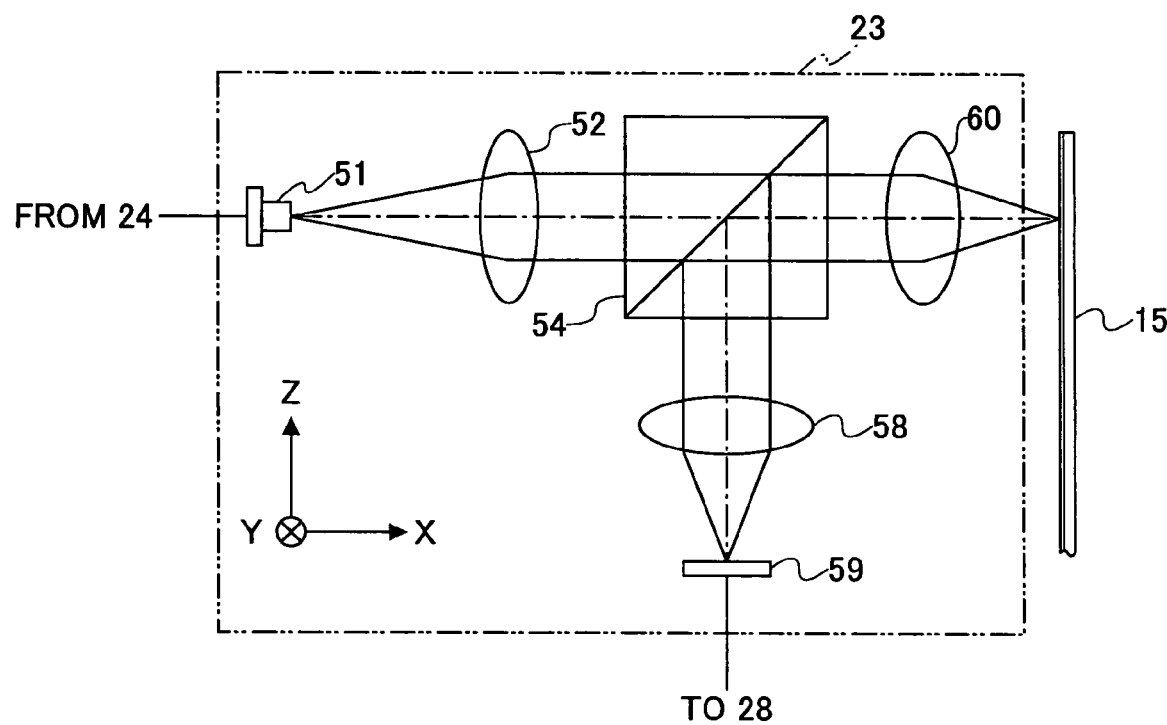
FIG. 2 is a schematic diagram illustrating a detailed configuration of an optical pickup device shown in FIG. 1.

FIG. 2 is a diagram illustrating an exemplary configuration of the optical pickup device 23. As is shown, the optical pickup device 23 may include a light source unit 51, a collimator lens 52, a beam splitter 54, an objective lens 60, a detection lens 58, a light receiver 59, and a drive system (including a focusing actuator, a tracking actuator, and a seek motor, none of which are shown in the drawing), for example.

The light source unit 51 may include a semiconductor laser as a light source for a DVD that emits an optical beam with a wavelength of 660 nm (not shown), and a semiconductor laser as a light source for a CD that emits an optical beam with a wavelength of 780 nm (not shown). The light quantity of each optical beam emitted from the light source unit 51 is detected by a monitor (not shown), and the detection result is fed back to the laser control circuit 24 as an emitted light quantity signal. Also, in the present embodiment, a maximum intensity emission direction of an optical beam emitted from the light source unit 51 is set to the +X direction in FIG. 2. Further, when the optical disk 15 is a DVD, the semiconductor laser for the DVD is selected, and when the optical disk 15 is a CD, the semiconductor laser for the CD is selected.

The collimator lens 52 is placed at the +X direction side of the light source unit 51, and collimates the optical beam emitted from the light source unit 51. The beam splitter 54 is placed at the +X direction side of the collimator lens 52 and diverts the reflected light from the optical disk 15 in the −Z direction. The objective lens 60 is placed at the +X direction side of the beam splitter 54 and condenses the optical beam passing through the beam splitter 54 so that a beam spot is formed on the recording surface of the optical disk 15.

The detection lens 58 is placed at the −Z direction side of the beam splitter 54 and condenses the reflected light diverted by the beam splitter 54 onto a light receiving surface of the light receiver 59. The light receiver 59 may be identical to a conventional optical pickup device that outputs to the replay signal processing circuit 28 a plurality of signals including wobble signal information, replay data information, focus error information, and track error information, for example.

Figure 3:
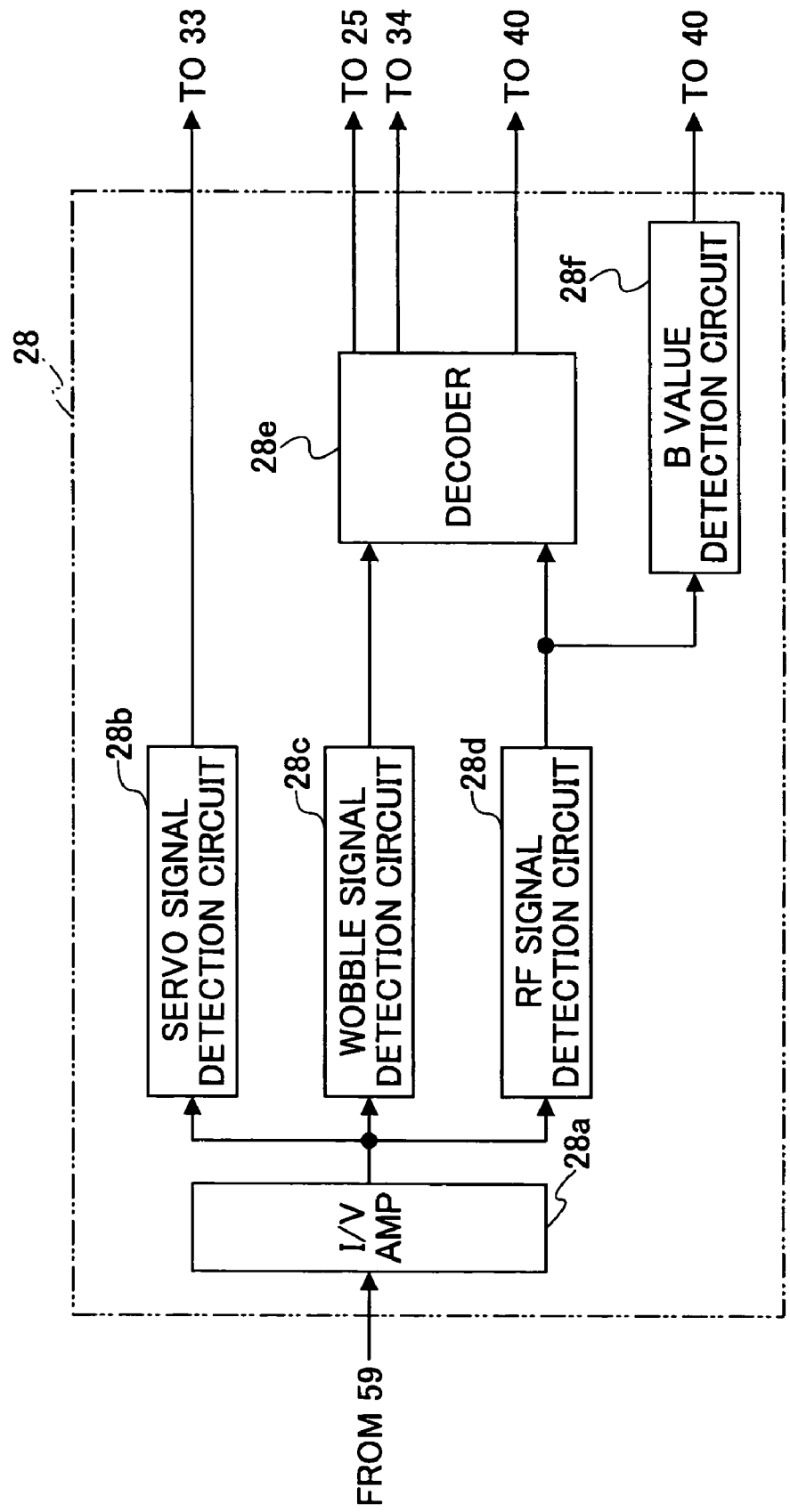
FIG. 3 is a block diagram illustrating a detailed configuration of a replay signal processing circuit shown in FIG. 1.

FIG. 3 is a block diagram illustrating an exemplary configuration of the replay signal processing circuit 28. As is shown, the replay signal processing circuit 28 may include an I/V amplifier 28a, a servo signal detection circuit 28b, a wobble signal detection circuit 28c, an RF signal detection circuit 28d, a decoder 28e, and a B value detection circuit 28f, for example.

The I/V amplifier 28a converts a current signal corresponding to an output signal of the light receiver 59 into a voltage signal. The servo signal detection circuit 28b detects a servo signal (e.g., focus error signal, track error signal) from the output signal of the I/V amplifier 28a. The servo signal detected herein is output to a servo controller 33. The wobble signal detection circuit 28c detects a wobble signal from the output signal of the I/V amplifier 28a. The RF signal detection circuit 28d detects an RF signal from the output signal of the I/V amplifier 28a.

The decoder 28e extracts data such as address information and a synchronization signal from the wobble signal detected by the wobble signal detection circuit 28c. The extracted address information is output to the CPU 40, and the synchronization signal is output to the encoder 25. Also, the decoder 28e performs processes such as demodulation and error correction processes on the RF signal detected by the RF signal detection circuit 28d, and stores the resulting data as replay data in the buffer RAM 34 via the buffer manager 37. If the replay data corresponds to music data, the signal from the decoder 28e is output to an external audio apparatus, for example, via a D/A converter (not shown). The B value detection circuit 28f samples the RF signal detected by the RF signal detection circuit 28d at a timing corresponding to the mark region, normalizes the sample by dividing it by the recording power, detects a so-called B value, and outputs the B value to the CPU 40. It is noted that in the replay signal processing circuit 28, a servo parameter according to the type of optical disk used (e.g., signal level adjustment gain) is set according to an instruction from the CPU 40.

Referring back to FIG. 1, the servo controller 33 generates a control signal for correcting a focus deviation based on the focus error signal from the replay signal processing circuit 28, and generates a control signal for correcting a track deviation based on the track error signal from the replay signal processing circuit 28. The above control signals are respectively output from the servo controller 33 to the motor driver 27.

The motor driver 27 drives the tracking actuator and focusing actuator of the optical pickup device 23 based on the control signals from the servo controller 33. In other words, tracking control and focus control are performed by the servo controller 33 and the motor driver 27. Also, the motor driver 27 controls the spindle motor 22 and the seek motor of the optical pickup device 23 based on instructions from the CPU 40.

The encoder 25 extracts data stored in the buffer RAM 34 via the buffer manager 37 according to an instruction from the CPU 40, performs processes such as data demodulation and attachment of an error correction code, generates a write signal to be written on the optical disk 15, and outputs to the laser control circuit 24 the generated signal in sync with the synchronization signal from the replay signal processing circuit 28.

Figure 4:
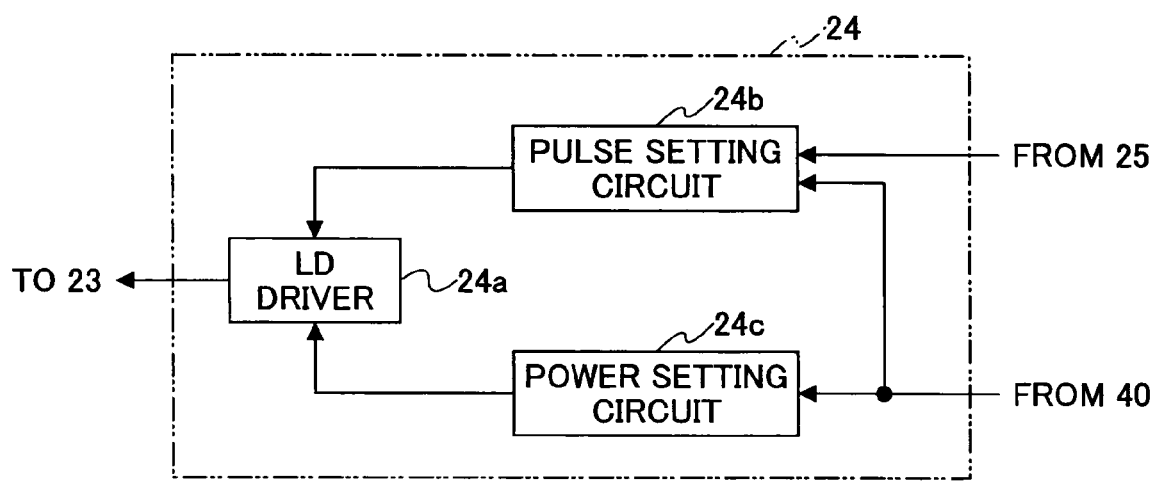
FIG. 4 is a block diagram illustrating a detailed configuration of laser control circuit shown in FIG. 1.

FIG. 4 is a block diagram illustrating an exemplary configuration of the laser control circuit 24. As is shown, the laser control circuit 24 may include a laser driver 24a, a pulse setting circuit 24b, and a power setting circuit 24c, for example. The pulse setting circuit 24b adjusts the pulse width of the write signal from the encoder 25 based on an instruction from the CPU 40. Also, the power setting circuit 24c sets the light emission power based on an instruction from the CPU 40. The LD driver 24a controls the output of the semiconductor laser of the optical pickup device 23 based on the write signal adjusted by the pulse setting circuit 24b and the light emission power set by the power setting circuit 24c. Further, the LD driver 24a performs feedback control of the output of the semiconductor laser based on the emitted light quantity signal.

Referring back to FIG. 1, the interface 38 corresponds to a bidirectional communication interface with the host 50, and may be a standard interface conforming to ATAPI (AT Attachment Packet Interface), SCSI (Small Computer System Interface), or USB (Universal Serial Bus), for example.

The ROM 39 stores programs including a program according to an embodiment of the present invention for determining the recording conditions (referred to as 'recording condition determining program' hereinafter), which program is described in code readable by the CPU 40 and is described in detail below.

The CPU 40 controls the operation of each of the component parts of the optical disk apparatus 20 according to the programs stored in the ROM 39, and temporarily stores in the RAM 41 data to be used for such control, for example. Also, in a case where the circuit system is divided into a CD circuit system and a DVD circuit system, the CPU 40 outputs a signal for selecting one of the two circuit systems. The programs stored in the ROM 39 are loaded into the main memory (not shown) of the CPU 40 when the power of the optical disk apparatus 20 is turned on.

The flash memory 43 may store, for example, a degradation hysteresis table and a specified medium table, which are described in greater detail below. It is noted that the contents stored in the flash memory 43 will not be erased even when the power of the optical disk apparatus 20 is turned off.

In the degradation hysteresis table, hysteresis information of the circumstances under which the recording power Pw has exceeded a preset threshold value Pk is stored for each semiconductor laser. The threshold value Pk is set individually for each semiconductor laser, and a value in the vicinity of this rated value is used in each corresponding semiconductor laser. It is noted that each threshold value may, for example, be changed by the host 50.

FIGS. 5A and 5B illustrate exemplary degradation hysteresis tables according to the present embodiment. FIG. 5A shows an example of a degradation hysteresis table pertaining to the semiconductor laser for DVD. The following information is stored in this table: 1,000 minutes is the total recording time during which a recording power greater than the threshold value Pk by 1 mW is previously used, 300 minutes is the total recording time during which a recording power greater than the threshold value Pk by 2 mW is previously used, 200 minutes is the total recording time during which a recording power greater than the threshold value Pk by 3 mW is previously used, 50 minutes is the total recording time in which a recording power greater than the threshold value Pk by 4 mW is previously used, 0 minutes is the total recording time in which a recording power greater than the threshold value Pk by 5 mW is previously used, and 0 minutes is the total recording time in which a recording power greater than the threshold value Pk by 6 mW is previously used.

The specified medium table stores medium information including the type, the manufacturer identification code, and the type code of an information recording medium of which the power margin extends over the light emission power levels in the vicinity of the threshold value Pk (denoted as 'Plimit' in the present example). It is preferred that the Plimit correspond to a value less than or equal to the threshold value Pk of the semiconductor laser. In the following descriptions, for the sake of convenience, the information recording medium corresponding to the medium information recorded in the specified medium table may be referred to as 'specified medium'. Generally, a CD-R has a relatively wide power margin and a DVD has a relatively narrow power margin.

Referring back to FIG. 1, the host 50 may include a main control apparatus 50*a*, an interface 50*b*, a hard disk drive (HDD) 50*c*, an input apparatus 50*d*, and a display apparatus 50*e*, for example.

The main control apparatus 50*a* may include a microcomputer, a main memory (neither of which are shown), for example, and may administer the overall control of the host 50.

The interface 50*b* corresponds to a bidirectional communication interface with the optical disk apparatus 20 and may be a standard interface conforming to ATAPI, SCSI, or USB, for example. The interface 50*b* may be connected to the interface 38 of the optical disk apparatus 20. The connection between the two interfaces may be established, for example, through cable connection using a communication cable (e.g., SCSI cable), or through wireless connection using infrared light.

In the hard disk 50*c*, a program described in code readable by the microcomputer of the main control apparatus 50*a* is stored.

The display apparatus 50*e* includes a display unit (not shown) implementing, for example, a CRT (cathode ray tube), an LCD (liquid crystal display), or a PDP (plasma display panel) to display various information items from the main control apparatus 50*a*.

The input apparatus 50*d* includes at least one form of input medium (not shown), which may, for example, be a key board, a mouse, or a pointing pad. The input medium conveys information input by the user to the main control apparatus 50*a*. The information from the input medium may be input by wireless means, or the display apparatus 50*e* and the input apparatus 50*d* may be combined take the form of a CRT with a touch panel, for example.

In the following, a process executed by the CPU 40 is described for obtaining the medium information when the optical disk 15 is loaded onto a predetermined position of the optical disk apparatus 20 of the present embodiment.

When it is detected that the optical disk 15 has been loaded, the optical disk 15 is rotated at a predetermined linear speed (e.g., single speed) and the type of disk corresponding to that of the optical disk 15 is determined based on whether tracking control and focus control have been properly performed, whether address information has been properly extracted, and whether the reflection rate at the recording surface exceeds the prescribed value, for example. In the present example, it is assumed that the optical disk 15 is determined to correspond to a DVD-R.

Then, information such as the manufacturer identification code and the type code that are recorded at predetermined positions on the optical disk 15 are read, and the read out information together with the determination result are stored in the RAM 41 as medium information. In this way, the process of obtaining the medium information is completed.

Figure 6:
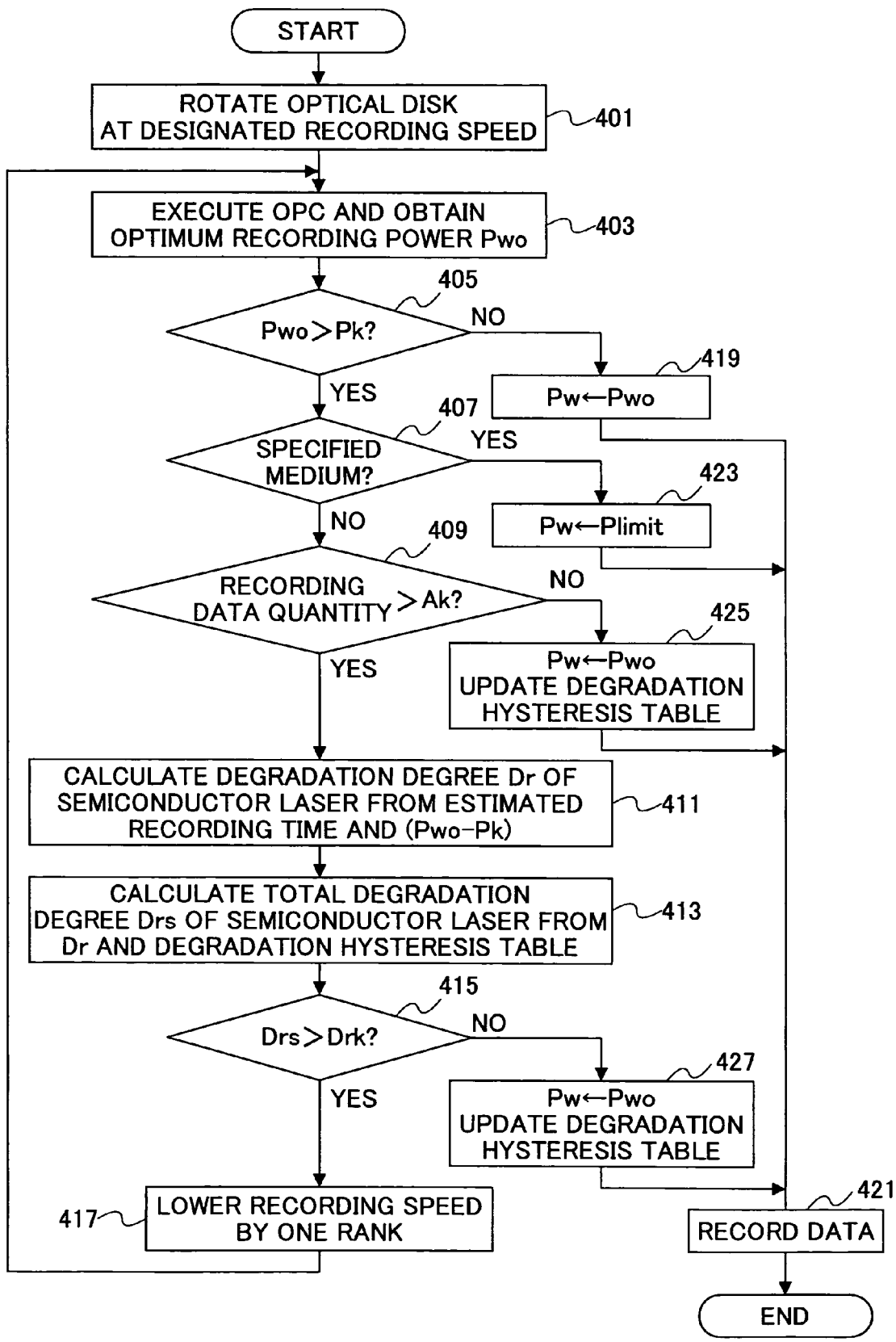
FIG. 6 is a flowchart illustrating a recording condition determination process according to an embodiment of the present invention that is performed before recording is started.

FIG. 6 is a flowchart illustrating processes executed upon receiving a recording command from the host 50. The process steps shown in this flowchart correspond to a sequence of process algorithms executed by the CPU 40.

Upon receiving the recording command from the host 50, the start address of the program corresponding to the flow chart of FIG. 6 is set to a program counter of the CPU 40 and the process sequence is started. In this example, it is assumed that the process of obtaining medium information has already been performed. Also, it is assumed that information pertaining to the amount of data to be recorded is attached to the recording command.

First, in step 401, a control signal for controlling the rotation of the spindle motor 22 according to the designated recording speed is output to the motor driver 27.

Next, in step 403, OPC (optimum power control) is performed to determine the optimum recording power. Specifically, while gradually changing the recording power, predetermined data are written on a test writing area called PCA (Power Calibration Area), after which the written data are successively replayed. It can be presumed that the highest recording quality is achieved when an asymmetry value detected from the RF signal during the replay is substantially equal to a target value obtained in advance from experiments, for example, and the recording power used to obtain such an asymmetry value is determined to correspond to the optimum recording power Pwo. Also, using the B value detection circuit 28f, the B value for the highest recording quality is detected and the detected value is stored in the RAM 41 as a target B value.

Next, in step 405, it is determined whether the optimum recording power Pwo obtained in the OPC exceeds the threshold value Pk. If the optimum recording power Pwo exceeds the threshold value Pk, the determination made in this step will be a positive determination (Y), and the host 50 is notified. Preferably, information pertaining to the service life of the light source such as the estimated recording time and the total degradation degree is attached to the notification. Then, the process moves on to step 407.

In step 407, medium information is read from the RAM 41, and referring to the specified medium table stored in the flash memory 43, it is determined whether the optical disk 15 corresponds to a specified medium in the specified medium table. If the optical disk 15 does not correspond to the specified medium, a negative determination (N) is made and the process moves on to step 409.

In step 409, the information pertaining to the amount of data to be recorded that is attached to the recording command is extracted, a recording data quantity is obtained based on the extracted information, and a determination is made as to whether this recording data quantity exceeds a predetermined quantity Ak that is set in advance. If the recording data quantity exceeds the predetermined quantity Ak, a positive determination (Y) is made, and the process moves on to step 411. It is noted that the predetermined quantity Ak may be changed by a command from the host 50, for example.

In step 411, a recording time Tw is estimated based on the recording data quantity and the recording speed. Then, a degradation degree Dr of the semiconductor laser is calculated based on the following formula (1).

$$Dr = (Pwo - Pk) \times Tw \qquad (1)$$

In the present example, it is assumed that Pwo−Pk=2 (mW), and Tw=20 (minutes); therefore, Dr=40.

Next, in step 413, a total degradation degree Drs is calculated by referring to the degradation hysteresis table stored in the flash memory 43. In the present example, Drs=(1000+600+600+200)+40=2440.

Next, in step 415, it is determined whether the calculated total degradation degree Drs exceeds a predetermined value Drk that is set in advance. If the total degradation degree Drs exceeds the predetermined value Drk, a positive determination is made and the process moves on to step 417.

In step 417, the recording speed is lowered by one rank, and the host 50 is notified, after which the process goes back to step 403.

In the case where the optimum recording power Pwo is determined to be less than or equal to the threshold value Pk in step 405, a negative determination (N) is made and the process moves on to step 419. In step 419, the optimum recording power Pwo is provided to the power setting circuit 24c as the recording power Pw. Then, after recording information including the recording speed and the recording power is signaled to the host 50, the process moves on to step 421 where user data are recorded.

In the case where it is determined that the optical disk 15 corresponds to the specified medium in step 407, a positive determination (Y) is made and the process moves on to step 423. In step 423, the light emission power Plimit is set as the recording power Pw and this is provided to the power setting circuit 24c. Then after recording information including the recording speed and the recording power is signaled to the host 50, the process moves on to step 421.

In the case where the recording data quantity is determined to be less than or equal to the predetermined quantity Ak in step 409, a negative determination (N) is made and the process moves on to step 425. In step 425, the optimum recording power Pwo is provided to the power setting circuit 24c as the recording power Pw, and the degradation hysteresis table is updated. FIG. 5B illustrates an updated degradation hysteresis table of the present example. Then, after recording information including the recording speed and the recording power is signaled to the host 50, the process moves on to step 421 where user data are recorded.

In the case where the total degradation degree Drs is determined to be less than or equal to the predetermined value Drk in step 415, a negative determination (N) is made and the process moves on to step 427. In step 427, the optimum recording power Pwo is provided to the power setting circuit 24c as the recording power Pw, and the degradation hysteresis table is updated, as in step 423. Then, after recording information including the recording speed and the recording power is signaled to the host 50, the process moves on to step 421 where user data are recorded.

During user data recording, a so-called running OPC is performed as needed or desired. For the running OPC, the B value obtained from the B value detection circuit 28f and the target value for the B value that is stored in the RAM 41 (the target B value obtained in the OPC) are compared, and the recording power is corrected based on the difference between the two values, is performed as needed or desired.

In the following, the recording process of step 421 is described.

A signal controlling the seek motor in order for the optical pickup device 23 to be positioned at the write starting point is output to the motor driver 27 based on the address information output from the replay signal processing circuit 28 at each predetermined timing. Then, upon receiving a notification from the buffer manager 37 that the amount of user data stored in the buffer RAM 34 has exceeded a predetermined value, an instruction to generate a write signal is sent to the encoder 25. Then, when the optical pickup device 23 reaches the write starting point, this information is provided to the encoder 25. In this way, the user data are recorded on the optical disk 15 via the encoder 25, the laser control circuit 24, and the optical pickup device 23.

Also, during user data recording, a process of monitoring the recording power is performed at every predetermined time interval (e.g., every 10 seconds). This process of monitoring the recording power is next described using FIG. 7.

FIG. 7 is a flowchart illustrating the process steps for monitoring the recording power that correspond to a sequence of process algorithms that are executed by the CPU 40. When the recording of user data is started, a start address of the program corresponding to the flowchart of FIG. 7 is set to the program counter of the CPU 40 at every predetermined time interval so that the monitoring process is started. Thus, this process may be in the form of a timer interruption process.

First, in step 501, the recording power Pw currently being set is obtained.

Then, in step 503, it is determined whether the currently set recording power Pw exceeds the threshold value Pk. If the recording power Pw exceeds the threshold value Pk, a positive determination (Y) is made, and the host 50 is notified. Herein, information pertaining to the service life of the light source such as the estimated recording time and the total degradation degree may be attached to the notification. Then, the process moves on to step 505.

In step 505, it is determined whether the remainder of the recording data exceeds a predetermined quantity Bk that is set in advance. If the remainder of the recording data exceeds the predetermined quantity Bk, a positive determination (Y) is made and the process moves on to step 507. It is noted that the predetermined quantity Bk may be equal to the predetermined quantity Ak.

In step 507, the remainder of the recording time Twr is estimated based on the remainder of the recording data and the recording speed. Then, the degradation degree Dr of the semiconductor laser is calculated based on formula (2) shown below.

$$Dr=(Pw-Pk) \times Twr \qquad (2)$$

Then, in step 509, the total degradation degree Drs is calculated by referring to the degradation hysteresis table as in step 413.

In step 511, it is determined whether the calculated total degradation degree Drs exceeds the predetermined value Drk. If the calculated total degradation degree Drs exceeds the predetermined value Drk, a positive determination is made and the process moves on to step 513.

In step 513, the recording power is lowered by one rank and the host 50 is notified, after which the interruption process is ended. In this way, the optimum recording power is lowered by the running OPC that is successively performed.

In the case where the recording power Pw is determined to be less than or equal to the threshold value Pk in step 503, a negative determination is made and the interruption process is terminated at this point.

In the case where the remainder of the recording data is determined to be less than or equal to the predetermined quantity Bk in step 505, a negative determination (N) is made and the process moves on to step 515. In step 515, the degradation hysteresis table is updated after which the interruption process is terminated.

In the case where the total degradation degree Drs is determined to be less than or equal to the predetermined value Drk in step 511, a negative determination (N) is made and the process moves on to step 515. In step 515, the degradation hysteresis table is updated after which the interruption process is terminated.

In the following, the operations process of the CPU 40 upon receiving a replay command from the host 50 is described.

When the replay command from the host 50 is received, a control signal for controlling the rotation of the spindle motor 22 based on the replay speed is output to the motor driver 27 and the reception of the replay command is provided to the replay signal processing circuit 28. Then, a signal is output for controlling the seek motor in order for the optical pickup device 23 to be positioned at the read starting point based on the address information from the replay signal processing circuit 28.

Then, when the optical pickup device reaches the read starting point, this information is provided to the replay signal processing circuit 28. In this way, replay data are stored in the buffer RAM 34 via the replay signal processing circuit 28. When replay data stored in the buffer RAM 34 are assembled as sector data, this is signaled to the host 50 by the buffer manager 37 via the interface 38.

As can be appreciated from the above descriptions, the optical disk apparatus according to the present embodiment has recording power obtaining means, determination means, selection means, establishing means, storing means, and notification means that are realized by the CPU 40 and the programs executed by the CPU 40. Namely, before recording is started, the recording power obtaining means is realized by the process of step 403 shown in FIG. 6, the determination means is realized by the process of step 405, the selection means is realized by the processes of steps 407~415, the establishing means is realized by the processes of steps 423, 425, and 427, and the storing means is realized by the processes of steps 425 and 427. Also, during recording, the recording power obtaining means is realized by the process of step 501 shown in FIG. 7, the determination means is realized by the process of step 503, the selection means is realized by the processes of steps 505~511, the establishing means is realized by the process of step 513, and the storing means is realized by the process of step 515. However, the present embodiment is only an illustrative example of the present invention and by no means does this constitute a limitation to the scope of the present invention. For example, one or more of the functions realized by the processes of the programs of the CPU 40 may be realized by hardware, or all of the above functions may be realized by hardware.

Also, according to the present embodiment, the recording condition determination program is made up of the programs corresponding to the processes shown in the flowcharts of FIGS. 6 and 7 out of the various programs installed in the ROM 39. Namely, at the stage of pre-recording, a first procedure is realized by the program corresponding to the process of step 405 shown in FIG. 6, a second procedure is realized by the programs corresponding to the processes of steps 407~415, and a third procedure is realized by the programs corresponding to the processes of steps 423, 425, and 427. During recording, the first procedure is realized by the program corresponding to the process of step 503 shown in FIG. 7, the second procedure is realized by the programs corresponding to the processes of steps 505~511, and the third procedure is realized by the program corresponding to the process of step 513.

Also, at the pre-recording stage, a first step of the recording condition determining method of the present invention is realized by the process of step 405 shown in FIG. 6, a second step is realized by the processes of steps 407~415 shown in FIG. 6, and a third step is realized by the processes of steps 423, 425, and 427 shown in FIG. 6. During recording, the first step of the recording condition determining method is realized by the process of step 503 shown in FIG. 7, the second step is realized by the processes of steps 505~511 shown in FIG. 7, and the third step is realized by the process of step 513 shown in FIG. 7.

As is described above, in the recording condition determination according to the present embodiment, even when the optimum recording power obtained from the OPC exceeds the rated value for the semiconductor laser, if the power margin of the optical disk 15 is wide, the obtained light emission power that is in the vicinity of the rated value for the semiconductor laser may be established as the recording power. Herein, a predetermined recording quality can be maintained without lowering the recording speed. Thus, high quality recording at high speed can be realized while preventing the degradation of the semiconductor laser.

Also, according to the present embodiment, even when the optimum recording power obtained from the OPC exceeds the rated value for the semiconductor laser, if the amount of data to be recorded is small, the recording condition may be determined based on the obtained optimum recording power. Herein, the influence on the degradation of the semiconductor laser is minimal. Thus, high quality recording at high speed can be realized while preventing the degradation of the semiconductor laser.

Also, according to the present embodiment, even when the optimum recording power obtained from the OPC exceeds the rated value for the semiconductor laser, if the total degradation degree of the semiconductor laser calculated based on the hysteresis information pertaining to recording data and recording time is low, the recording condition is determined based on the obtained optimum recording power. Thus, high quality recording at high speed can be realized without adversely affecting the service life of the light source.

Also, according to the present embodiment, even when the optimum recording power obtained from the running OPC exceeds the rated value for the semiconductor laser, if the remainder of the recording data is small, recording can be continued using the current recording condition. Herein, the influence on the degradation of the semiconductor laser is minimal. Thus, high quality recording at high speed can be realized while preventing the degradation of the semiconductor laser. Also, according to the present embodiment, even when the optimum recording power obtained from the running OPC exceeds the rated value for the semiconductor laser, if the total degradation degree of the semiconductor laser calculated based on the hysteresis information pertaining to recording data and recording time is low, recording may be continued using the current recording condition. Thus, high quality recording at high speed can be realized without adversely affecting the service life of the light source.

Also, in the present embodiment, it is determined whether the recording data quantity exceeds the predetermined quantity in step 407 of FIG. 6; however, in an alternative embodiment, the recording time may be estimated based on the recording data quantity and the recording speed, and a determination is made as to whether the estimated recording time exceeds a predetermined time. In this case, the light emission time of the semiconductor laser is determined and the influence on the degradation degree can be evaluated more accurately.

Also, in the present embodiment, when the optimum recording power obtained from the OPC exceeds the threshold value Pk, it is determined whether the recording speed should be lowered based on the medium information, the recording data quantity and the degradation degree; however, the present invention is not limited to this embodiment, and for example, the determination as to whether the recording speed should be lowered may be made based on at least one of the medium information, the recording data quantity, and the degradation degree. In a case where medium information is not required in the determination of whether the recording speed should be lowered, the processes of steps 407 and 423 of FIG. 6 may be omitted, the specified medium table may be unnecessary, and the process of obtaining the medium information does not have to be performed. Alternatively, in a case where the degradation degree is not required in the determination of whether the recording speed should be lowered, the processes of steps 411, 413, 415, and 427 of FIG. 6 may be omitted, and the process of updating the degradation hysteresis table in step 425 may also be unnecessary. Further, in a case where the recording data quantity is not required for the determination of whether the recording speed should be lowered, the processes of steps 409 and 425 of FIG. 6 may be omitted.

Also, according to the present embodiment, when the optimum recording power obtained from the OPC exceeds the rated value for the semiconductor laser, the medium information, the recording data quantity, and the degradation degree are determined in this order; however, the present invention is not limited to this arrangement.

Also, according to the present embodiment, it is determined whether a remainder of the recording data exceeds a predetermined value in step 505 of FIG. 7; however, in an alternative embodiment, the remaining recording time may be estimated based on the remainder of recording data and the recording speed and it may be determined whether the estimated remaining recording time exceeds a predetermined time. In this case, the determination is made based on the light emission time of the semiconductor laser and the influence on the degradation degree can be evaluated more accurately.

Also, according to the present embodiment, when the optimum recording power obtained from the running OPC exceeds the threshold value Pk, it is determined whether the recording power should be lowered based on the remainder of recording data and the degradation degree. However, the present invention is not limited to this arrangement and, for example, the determination of whether the recording power should be lowered may be made based on the remainder of recording data or the degradation degree. In the case where the degradation degree is not required in the determination of whether the recording power should be lowered, the processes of steps 507, 509, 511, and 515 of FIG. 7 may be omitted. On the other hand, in the case where the remainder of recording data is not required in the determination of whether the recording power should be lowered, the process of step 505 of FIG. 7 may be omitted.

It is noted that in either the case in which the optimum recording power obtained from the OPC exceeds the threshold value Pk, or the case in which the optimum recording power obtained from the running OPC exceeds the threshold value Pk, if the degradation degree is not required in the determination of whether the recording speed/power should be lowered, the degradation hysteresis table may be omitted.

Also, according to the present embodiment, if the optimum recording power obtained from the running OPC exceeds the threshold value Pk, the remainder of recording data and the degradation degree are determined in this order. However, the present invention is not limited to this arrangement.

Also, according to the present embodiment, when the optimum recording power exceeds the threshold value Pk, the influence on the service life of the semiconductor laser is estimated and the determination of whether the recording condition should be changed is made based on the estimation result at the optical disk apparatus side. However, the present invention is not limited to this arrangement. For example, when the host 50 receives the notification that the optimum recording power obtained from the OPC exceeds the threshold value Pk, it may be arranged to display a plurality of choices such as 'do not change optimum recording power', 'obtain new optimum recording power by lowering recording speed and test writing', and 'lower recording power to predetermined value in vicinity of threshold value' on the display apparatus 50e. Then, when the user selects one of the choices through the input apparatus 50d, the host 50 may be directed to notify the optical disk apparatus 20 of the selection result. Then the optical disk 20 may determine the recording condition based on the selection result, namely, the user's choice, from the host 50. Similarly, the host 50 may be programmed to display a plurality of choices such as 'do not change optimum recording power' and 'lower recording power by one rank' on the display apparatus 50e upon receiving a notification that the optimum recording power obtained from the running OPC exceeds the threshold value Pk. Then, when the user selects one of the choices through the input apparatus 50d, the host 50 may be directed to notify the optical disk apparatus 20 of the selection result. Upon displaying the choices, if the information pertaining to the service life of the light source such as the estimated recording time and the total degradation degree has been sent from the optical disk apparatus 20, such information may preferably be displayed on the display apparatus 50e so that the user may take the information into consideration upon making a choice.

The selection by the user may be realized by an operating system that manages the host 50, for example.

Alternatively, the processes to be performed when the optimum recording power obtained from the running OPC exceeds the threshold value Pk may be preset. For example, the process to be performed when the optimum recording power obtained from the OPC exceeds the threshold value Pk and the process to be performed when the optimum recording power obtained from the running OPC exceeds the threshold value Pk may be set in advance by the user via the host 50. According to this arrangement, the optical disk apparatus performs the process that is preset by the user when the optimum recording power obtained from the OPC exceeds the threshold value Pk, for example.

Also, according to the present embodiment, the optical disk 15 corresponds to a DVD-R; however, the present invention is not limited to this arrangement.

Also, the optical pickup device according to the present embodiment has two types of semiconductor lasers that emit optical beams with differing wavelengths. However, the present invention is not limited to this arrangement and, for example, the optical pickup device may have one semiconductor laser. The optical pickup device may implement one of a semiconductor laser that emits an optical beam with a wavelength of 405 nm, a semiconductor laser that emits an optical beam with a wavelength of 660 nm, and a semiconductor laser that emits an optical beam with a wavelength of 780 nm.

Further, in the present embodiment, a semiconductor laser for DVD and a semiconductor laser for CD are provided; however, the present invention is not limited to this arrangement. For example, one of the above semiconductor lasers may be replaced by a semiconductor laser that emits an optical beam with a wavelength of 405 nm.

Also, the optical disk apparatus of the present embodiment is capable of recording and replaying information. However, the present invention is not limited to this arrangement, and of the functions of recording, replaying and erasing information, the optical disk apparatus of the present invention may at least be capable of recording information.

Also, the recording condition determination program of the present embodiment is stored in the ROM 39; however, the recording condition determination program may be stored in other media such as a CD-ROM, a magneto-optical disk, a flash memory, or a flexible disk. In this case, a drive apparatus for the corresponding media is implemented, and the recording condition determination program is installed from the drive apparatus. In other words, the storage medium of the present invention may take any form as long as the recording condition determination program stored therein can be loaded into the main memory of the CPU 40.

The present application is based on and claims the benefit of the earlier filing date of Japanese Patent Application No.2002-359361 filed on Dec. 11, 2002, the entire contents of which are hereby incorporated by reference.

What is claimed is:

1. A recording condition determining method realized in an information recording apparatus that records information on an information recording medium using an optical beam emitted from a light source, the method comprising:
   a first step of determining whether an optimal recording power of the light source is greater than a preset threshold value based on at least one of a result of test writing on the information recording medium and a result of receiving reflected light from the information recording medium during recording;
   a second step of selecting according to a predetermined selection criterion at least one of a plurality of choices including a choice of not changing the optimum recording power, said second step being realized when it is determined in the first step that the optimum recording power exceeds the threshold value; and
   a third step of establishing a recording condition based on the selected choice, wherein the selection criterion corresponds to a criterion of selecting the choice of not changing the optimum recording power if an estimation of an influence on a service life of the light source does not exceed a predetermined level.

2. The recording condition determining method as claimed in claim 1, wherein the influence on the service life of the light source is estimated based on at least one of an amount of data to be recorded, an amount of time required for recording, and hysteresis information pertaining to recording power and recording time of a past recording.

3. A recording condition determining method realized in an information recording apparatus that records information on an information recording medium using an optical beam emitted from a light source, the method comprising:
   a first step of determining whether an optimal recording power of the light source is greater than a preset threshold value based on at least one of a result of test writing on the information recording medium and a result of receiving reflected light from the information recording medium during recording;
   a second step of selecting according to a predetermined selection criterion at least one of a plurality of choices including a choice of not changing the optimum recording power, said second step being realized when it is determined in the first step that the optimum recording power exceeds the threshold value;
   a third step of establishing a recording condition based on the selected choice; and
   a fourth step of storing hysteresis information including the optimum recording power and a light emission time of the light source at said optimum recording power, said fourth step being performed when the choice of not changing the optimum recording power is selected according to the selection criterion in the second step.

4. A program implemented in an information recording apparatus that is adapted to record information on an information recording medium using an optical beam emitted from a light source, said program running on a control unit of the information recording apparatus to execute:
   a first procedure of determining whether an optimal recording power of the light source exceeds a preset threshold value based on at least one of a result of test writing on the information recording medium and a result of receiving reflected light from the information recording medium during recording;

a second procedure of selecting according to a predetermined selection criterion at least one of a plurality of choices including a choice of not changing the optimum recording power, said second procedure being realized when it is determined in the first procedure that the optimum recording power exceeds the threshold value; and a third procedure of establishing a recording condition based on the selected choice, wherein the selection criterion corresponds to a criterion of selecting the choice of not changing the optimum recording power if an estimation of an influence on a service life of the light source does not exceed a predetermined level.

5. An information recording apparatus that is adapted to record information on an information recording medium using an optical beam emitted from a light source, said apparatus comprising:

recording power obtaining means for obtaining an optimal recording power of the light source based on at least one of a result of test writing on the information recording medium and a result of receiving reflected light from the information recording medium while recording information;

determination means for determining whether the optimum recording power exceeds a preset threshold value;

selection means for selecting according to a predetermined selection criterion at least one of a plurality of choices including a choice of not changing the optimal recording power, said selection means being realized when it is determined by the determination means that the optimal recording power exceeds the threshold value;

establishing means for establishing a recording condition based on the selected choice;

first storage means in which hysteresis information pertaining to the light source is stored; and storing means for storing in the first storage means hysteresis information including the optimal recording power and a light emission time of the light source at said optimal recording power, said storing means being realized when the choice of not changing the optimal recording power is selected by the selection means.

6. An information recording apparatus that is adapted to record information on an information recording medium using an optical beam emitted from a light source, said apparatus comprising:

recording power obtaining means for obtaining an optimal recording power of the light source based on at least one of a result of test writing on the information recording medium and a result of receiving reflected light from the information recording medium while recording information;

determination means for determining whether the optimum recording power exceeds a preset threshold value;

selection means for selecting according to a predetermined selection criterion at least one of a plurality of choices including a choice of not changing the optimal recording power, said selection means being realized when it is determined by the determination means that the optimal recording power exceeds the threshold value;

establishing means for establishing a recording condition based on the selected choice;

type information obtaining means for obtaining type information of the information recording medium; and second storage means storing information on at least one type of information recording medium of which a power margin extends over a predetermined value in the vicinity of the threshold value; wherein the choices further include a choice of changing the optimal recording power to the predetermined value in the vicinity of the threshold value; and the selection means is arranged to select the choice of changing the optimal recording power to the predetermined value in the vicinity of the threshold value when the type information of the information recording medium obtained by the type information obtaining means corresponds to a type of information recording medium stored in the second storage means.

7. An information recording system for recording information on an information recording medium, comprising:

an information recording apparatus that is adapted to record information on the information recording medium using an optical beam emitted from a light source, said apparatus including:

recording power obtaining means for obtaining an optimal recording power of the light source based on at least one of a result of test writing on the information recording medium and a result of receiving reflected light from the information recording medium while recording information;

determination means for determining whether the optimum recording power exceeds a preset threshold value;

selection means for selecting according to a predetermined selection criterion at least one of a plurality of choices including a choice of not changing the optimal recording power, said selection means being realized when it is determined by the determination means that the optimal recording power exceeds the threshold value; and establishing means for establishing a recording condition based on the selected choice; said system further comprising:

an information processing apparatus that is adapted to control said information recording apparatus, wherein the information processing apparatus includes a display unit that is adapted to display the choices including the choice of not changing the optimal recording power when the optimal recording power exceeds the threshold value, an input unit for selecting at least one of the choices displayed by the display unit, and a notification unit for notifying the information recording apparatus of the choice selected at the input unit.

* * * * *